United States Patent
Wagle et al.

(10) Patent No.: US 11,485,898 B2
(45) Date of Patent: Nov. 1, 2022

(54) ENVIRONMENTALLY FRIENDLY EPOXIDIZED VEGETABLE OIL BASED FATTY ACID ESTERS TO PREVENT LOSS CIRCULATION

(71) Applicant: SAUDI ARABIAN OIL COMPANY, Dhahran (SA)

(72) Inventors: Vikrant Wagle, Dhahran (SA); Jothibasu Ramasamy, Dhahran (SA); Abdullah S. Al-Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/076,139

(22) Filed: Oct. 21, 2020

(65) Prior Publication Data
US 2022/0119698 A1 Apr. 21, 2022

(51) Int. Cl.
C09K 8/508 (2006.01)
E21B 21/00 (2006.01)
C08L 63/00 (2006.01)

(52) U.S. Cl.
CPC ............ C09K 8/5086 (2013.01); C08L 63/00 (2013.01); E21B 21/003 (2013.01)

(58) Field of Classification Search
None
See application file for complete search history.

(56) References Cited

U.S. PATENT DOCUMENTS 4,040,994 A * 8/1977 Lewis .................. C08G 59/42
528/103.5

4,072,194 A 2/1978 Cole et al.
(Continued)

FOREIGN PATENT DOCUMENTS

| EP | 2167604 A1 | 3/2010 |
| WO | 2020046405 A1 | 3/2020 |
| WO | 2020046427 A1 | 3/2020 |

*Primary Examiner* — Jeffrey D Washville
(74) *Attorney, Agent, or Firm* — Osha Bergman Watanabe & Burton LLP

(57) ABSTRACT

Embodiments disclosed relate to a composition and a method of treating a formation. The method includes introducing a loss circulation material system through a wellbore into a formation, where the loss circulation material system is comprised of an esterified derivative of an epoxidized organic material and a curing agent. The esterified derivative of an epoxidized organic material has a formula of:

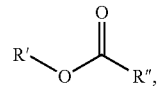

Formula I where R' comprises H, a substituted or an unsubstituted (C1-C12) hydrocarbyl group; and where R" comprises a substituted or an unsubstituted (C2-C30) hydrocarbyl group, including where at least one oxygen atom is attached to two different adjacent carbon atoms of the (C2-C30) hydrocarbyl group. The method also includes maintaining wellbore conditions such that the loss circulation material system cures into a loss circulation material in the formation. The cured loss circulation material may withstand a pressure differential up to about 20,000 psid.

14 Claims, 2 Drawing Sheets

(56) References Cited

U.S. PATENT DOCUMENTS

| | | | |
|---|---|---|---|
| 5,296,520 A * | 3/1994 | Gerber | C04B 26/122 |
| | | | 525/485 |
| 5,458,195 A | 10/1995 | Totten et al. | |
| 5,875,845 A | 3/1999 | Chatterji et al. | |
| 6,194,490 B1 | 2/2001 | Roth et al. | |
| 6,802,375 B2 | 10/2004 | Bosma et al. | |
| 8,235,116 B1 | 8/2012 | Burts, Jr. et al. | |
| 9,550,933 B2 | 1/2017 | Chatterji et al. | |
| 9,784,079 B2 | 10/2017 | Salla et al. | |
| 10,005,954 B2 | 6/2018 | Raysoni et al. | |
| 10,266,749 B2 | 4/2019 | Belakshe et al. | |
| 10,280,122 B2 | 5/2019 | Salla et al. | |
| 10,344,200 B2 | 7/2019 | Salla et al. | |
| 2006/0020062 A1 | 1/2006 | Bloom | |
| 2007/0287640 A1 | 12/2007 | Ballard | |
| 2007/0287767 A1 | 12/2007 | Ballard | |
| 2010/0282470 A1 | 11/2010 | Alberty et al. | |
| 2013/0081813 A1 | 4/2013 | Liang et al. | |
| 2016/0200960 A1 | 7/2016 | Nguyen et al. | |
| 2018/0148624 A1 | 5/2018 | Kierat et al. | |
| 2018/0155605 A1 | 6/2018 | Chatterji et al. | |
| 2018/0230367 A1 | 8/2018 | Eluru et al. | |
| 2019/0112522 A1 | 4/2019 | Khamatnurova et al. | |
| 2019/0177604 A1 | 6/2019 | Belakshe et al. | |

* cited by examiner

US 11,485,898 B2

ENVIRONMENTALLY FRIENDLY EPOXIDIZED VEGETABLE OIL BASED FATTY ACID ESTERS TO PREVENT LOSS CIRCULATION

BACKGROUND

Various challenges are encountered during drilling and production operations of a hydrocarbon production well. For example, fluids used in drilling, completion, or servicing of a wellbore can be lost to the subterranean formation while circulating the fluids in the wellbore. In particular, the fluids may enter the subterranean formation via depleted zones, zones of relatively reduced pressure (as compared to the wellbore), "loss circulation zones" having naturally occurring fractures, weak zones having fracture gradients exceeded by the hydrostatic pressure of the drilling fluid, and so forth. The extent of fluid losses to the formation may range from minor losses (for example, less than 10 barrels/hour (bbl/hr)), also referred to as seepage loss, to severe (for example, greater than 100 bbl/hr), or even greater, such as where fluid fails to return to the surface, also referred to as complete fluid loss. As well, the type of degree fluid loss may differ depending on the type of fluid in the wellbore, where the degree of loss for oil- and synthetic oil-based muds are considered more significant at lesser amounts versus the same quantity for water-based muds due to the potential economic and environmental impacts.

Lost circulation can be encountered during any stage of operations. Lost circulation occurs when drilling fluid (or drilling mud) pumped into a well returns partially or does not return to the surface. While de minimis fluid loss is expected, excessive fluid loss is not desirable from a safety, an economical, or an environmental point of view. This is especially true when working with water-bearing formations, such as aquifers that have drinking quality fresh or mineral water, or such as brine- or formation water-bearing formations, which may contaminate hydrocarbon production, cause corrosion issues, and foul cementing jobs. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. In extreme cases, lost circulation problems may force abandonment of a well.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to a method of treating a formation. The method includes introducing a loss circulation material system through a wellbore into a formation. The loss circulation material system is comprised of an esterified derivative of an epoxidized organic material and a curing agent. The esterified derivative of an epoxidized organic material has a formula of

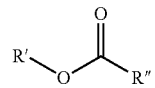

Formula I where R' comprises H, a substituted or an unsubstituted (C1-C12) hydrocarbyl group; and where R" comprises a substituted or an unsubstituted (C2-C30) hydrocarbyl group, including where at least one oxygen atom is attached to two different adjacent carbon atoms of the (C2-C30) hydrocarbyl group. The method also includes maintaining wellbore conditions such that the loss circulation material system cures into a loss circulation material in the formation.

In another aspect, embodiment disclosed relate to a composition. A loss circulation material system comprising a mixture of an esterified derivative of an epoxidized organic material and a curing agent, where the esterified derivative of an epoxidized organic material has a formula of:

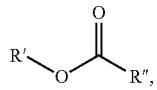

Formula I where R' comprises H, a substituted or an unsubstituted (C1-C12) hydrocarbyl group; and where R" comprises a substituted or an unsubstituted (C2-C30) hydrocarbyl group, including where at least one oxygen atom is attached to two different adjacent carbon atoms of the (C2-C30) hydrocarbyl group.

Other aspects and advantages of this disclosure will be apparent from the following description made with reference to the accompanying drawings and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

Figure 1:
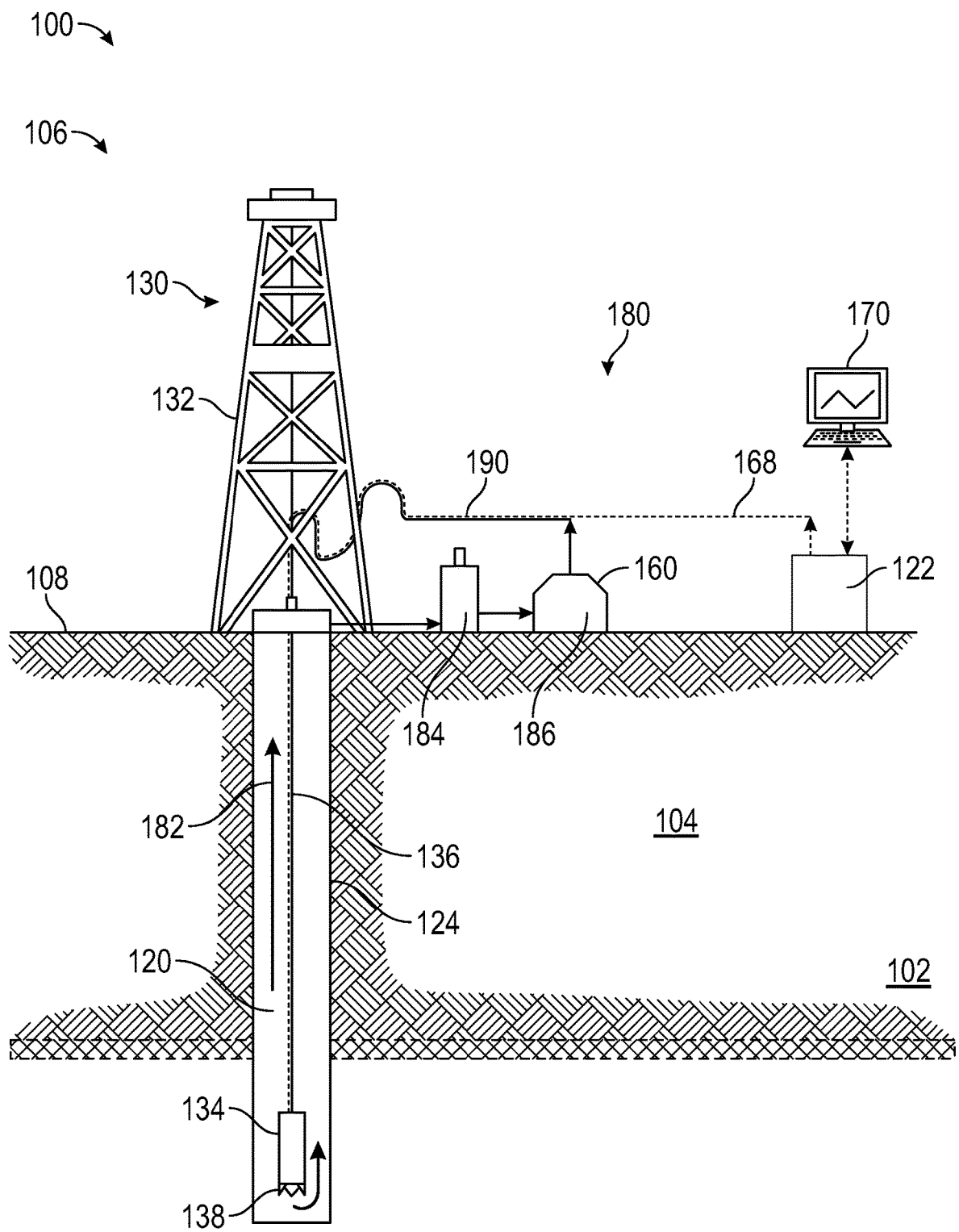
FIG. 1 is a diagram that illustrates a well environment 100.

In the figures, down are toward or at the bottom and up are toward or at the top of the figure. "Up" and "down" are generally oriented relative to a local vertical direction. However, as used throughout this disclosure, the terms "uphole" and "downhole" may refer to a position within a wellbore relative to the surface, with "uphole" indicating direction or position closer to the opening at the surface for the wellbore and "downhole" referring to direction or position farther away from the opening at the surface. One of ordinary skill in the art understands that an object or a process may be "uphole" or "downhole" of another object or process while having the same true vertical depth relative to the surface of the earth.

DETAILED DESCRIPTION

Embodiments of the present disclosure relate generally to a loss circulation material system comprising a mixture of an esterified derivative of an epoxidized organic material and a curing agent. Exposing the mixture to temperatures greater than room temperature, such as those present in a wellbore or in a subterranean formation, the mixture gels and cures into a loss circulation material (LCM). The resultant LCM is impenetrable to fluids, that is, it does not permit fluids to traverse its polymer matrix and "seep" through. The resultant LCM is also resilient in that it is able to maintain significant differential pressure differences while not losing mechanical integrity.

The use of esterified derivative of the epoxidized organic material, especially of epoxidized naturally occurring materials, such as vegetable-oil based fatty acids, provides several benefits. The reduced toxicity of ester-modified vegetable oil products versus fully synthetic resins provides an increased margin of safety at the work site, for example, if an amount of material was returned with recirculation of the mud upon successful mitigation of the loss circulation zone. In addition, the esterified derivatives of the naturally occurring materials remain relatively easier to decompose biologically. This permits use of an appropriate amount of the esterified derivative of the naturally occurring materials as part of the loss circulation material system to assure mitigation of the loss circulation zone or low-pressure water-bearing formations, such as an aquifer, by forming the loss circulation material. If excess epoxidized vegetable oil-based fatty acid esters are provided into the loss circulation zone or low-pressure water-bearing formations, any remaining esterified derivative of the naturally occurring materials that do not thermally degrade in time can be effectively reduced by biological actors upon reaching the surface.

Methods disclosed include introduction of a loss circulation material system to a wellbore. The application of the loss circulation material system upon curing can provide effective zonal isolation to loss circulation zones, water-bearing formations, and portions of hydrocarbon-bearing formation with excessive water production.

FIG. 1 is a diagram that illustrates a well environment 100 in accordance with one or more embodiments. The well environment 100 includes a target formation 102 for treatment located in a subsurface formation ("formation") 104 and a well system 106.

The formation 104 may include a porous or fractured rock formation that resides underground, beneath the surface 108 of the Earth. The surface 108 may be dry land or ocean bottom. The well system 106 may be for a hydrocarbon well, such as an oil well, a gas well, a gas condensate well, or a mixture of hydrocarbon-bearing fluids. The target formation 102 may be low-pressure formation (for example, a gas-depleted former hydrocarbon-bearing formation), a water-bearing formation (for example, fresh water, brine, former waterflood), or a loss circulation zone. The formation 104 and the target formation 102 may each include different layers of rock having varying characteristics, such as degrees of density, permeability, porosity, and fluid saturations. In the case of the well system 106 being operated as a production well, the well system 106 may facilitate the extraction of hydrocarbons (or "production") from a hydrocarbon-bearing formation. In the case of the well system 106 being operated as an injection well, the well system 106 may facilitate the injection of substances, such as gas or water, into a hydrocarbon-bearing formation. In the case of the well system 106 being operated as a monitoring well, the well system 106 may facilitate the monitoring of various characteristics of the formation 104 or a hydrocarbon-bearing formation, such as reservoir pressure or saturation.

The well system 106 may include a wellbore 120, a well control system (or "control system") 122 and a drilling system 130. The control system 122 may control various operations of the well system 106, such as well drilling operations, well completion operations, well production operations or well or formation monitoring operations.

The wellbore 120 may include a bored hole that extends from the surface 108 into the formation 104, such as into and through target formation 102. Wellbore 120 is defined by wellbore wall 124. Although shown as a vertical well, wellbore 120 may take a deviated or horizontal configuration and still use similar relative terminology.

The wellbore 120 may be created, for example, by the drilling system 130 boring through the formation 104. The drilling system 130 may include a drilling rig 132 and a drill string 134. The drill string 134 may include a drill pipe 136 and a drill bit 138. In some embodiments, the drill bit 138 includes a cutting drill bit having rotating teeth that can bore through the formation 104 to create the wellbore 120.

The wellbore 120 may provide for the circulation of drilling fluids or drilling "mud" 182 during drilling operations using a mud circulation system 180. Drilling mud 182 flows downhole through the drill string 134, out the drill bit 138 (cooling the drill bit 138 at the same time from heat of friction against the face of the wellbore 120, and back uphole through the annulus formed by the drill pipe 136 and the wellbore wall 124 carrying cuttings and other debris from the bottom of the wellbore 120. Upon reaching the surface 108, the drilling mud 182 passes into mud receiving tank 184, where the cuttings are separated from the drilling mud 182. As well, in the mud receiving tank 184 the drilling mud 182 is agitated such that it releases and dissolved gases from the drilling mud 182. The drilling mud 182 is passed to the mud storage tank 186, where it is held until it is pumped back to the drill string 134 via the mud return line 190 and then back downhole once again.

The mud circulation system 180 may provide useful information for operation and control of drilling activities. For example, with the return of less or no mud than what is introduced into the wellbore, that may indicate that wellbore fluid is entering a non-desired location, such as target formation 102, instead of performing its cooling and cuttings disposal functions. Each requires immediate action by an operator or a safety control system to mitigate the fluid loss. The well control system 122 in some embodiments is configured to determine and relay information to a control terminal 170 for viewing on an external viewer. Such maintenance or modifying operations as determined may be transmitted downhole from well control system 122 via control signal line 168.

As will be understood by one of ordinary skill in the art, FIG. 1 does not represent the totality of equipment necessary for performing drilling or other downhole operations; rather, the figure is merely illustrative for discussion purposes. Supporting equipment for the system may include additional standard components or equipment that enables and makes operable the described apparatuses, processes, methods, systems, and compositions of matter. A "barrel" of fluid contains substantially 159 liters of fluid.

As used, the term "drilling fluid" refers to fluids, slurries, or muds used in drilling operations downhole, such as during the formation of the wellbore.

As used, the term "hydrocarbon-bearing formation" refers to a subterranean geologic region containing hydrocarbons, such as crude oil, hydrocarbon gases, liquid gas condensates, and combinations thereof, which may be extracted from the subterranean geologic region.

As used, the term "water-bearing formation" refers to a subterranean geologic region containing water-based fluids, including fresh waters, mineral waters, saline waters, brines, formation waters, reinjected production waters, or waterflood remnants from previously-produced hydrocarbon production. The water-bearing formation may comprise some hydrocarbons, but the majority of the fluid present in the subterranean region is aqueous.

As used, the term "fluid" includes liquids and gases, and material combinations including one or both, such as emulsions and slurries.

As used, the term "cure" or "curing" may refer to the process of cross-linking the esterified derivative of an epoxidized organic material, which is in a liquid form initially, of the loss circulation material system with a curing agent to form a semi-solid or solid loss circulation material. A cured loss circulation material is operable to resist fluid flow downhole in the loss circulation zone under differential pressure conditions.

As used, the term "cure time" may refer to a time duration between a first time at which a curing agent is added to the esterified derivative of an epoxidized organic material of the loss circulation material system and a second time at which the loss circulation material system has cured to form at least a semi-solid loss circulation material.

Composition

The loss circulation material system includes an esterified derivative of an epoxidized organic material. Examples of organic materials may include, for example, naturally occurring plant or animal matter, including vegetables, fruits, nuts or beans. In some embodiments, the esterified derivative of the epoxidized organic material includes an epoxidized vegetable oil-based fatty acid ester. The esterified derivative of the epoxidized organic material is cured with a curing agent present in the loss circulation material system at downhole conditions to form the loss circulation material.

Embodiments of the loss circulation material system may include an esterified derivative of an epoxidized organic material. Esterified derivative of an epoxidized organic material may have the configuration given in Formula I:

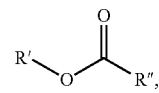

Formula I where R' can be independently chosen from H, a substituted or an unsubstituted ($C_1$-$C_{12}$) hydrocarbyl groups, and where R" can be independently chosen from a substituted or an unsubstituted ($C_2$-$C_{30}$) hydrocarbyl groups, including where at least one oxygen atom is attached to two different adjacent carbon atoms of the ($C_2$-$C_{30}$) hydrocarbyl group (that is, an epoxide). An example of an esterified derivative of an epoxidized organic material includes where R' is a methyl group and CO2R" is epoxidized oleic acid, which would be a methyl ester of epoxidized oleic acid.

Oils and fatty acids for originating an epoxidized vegetable oil-based fatty acid ester may be sourced from naturally occurring materials. Examples include, but are not limited to, soybean oil, linseed oil, rapeseed oil, cashew nut shell oil, *perilla* oil, tung oil, oiticia oil, safflower oil, poppy oil, hemp oil, cottonseed oil, sunflower oil, high-oleic triglycerides, triglycerides of *euphorbia* plants, peanut oil, olive oil, olive kernel oil, almond oil, kapok oil, hazelnut oil, apricot kernel oil, beechnut oil, lupine oil, maize oil, sesame oil, grapeseed oil, lallemantia oil, castor oil, herring oil, sardine oil, menhaden oil, whale oil, and tall oil.

Examples of epoxides derived from a naturally occurring material may include, but are not limited to, epoxidized soybean oil (ESO), epoxidized linseed oil (ELO), epoxidized octyl soyate, epoxidized propylene glycol dioleate (PGDO), methyl epoxy soyate, butyl epoxy soyate, epoxidized octyl soyate, epoxy linseed fatty acid, butyl epoxy linseed fatty acid, and octyl epoxy linseed fatty acid. An example of an ESO is shown as Formula II:

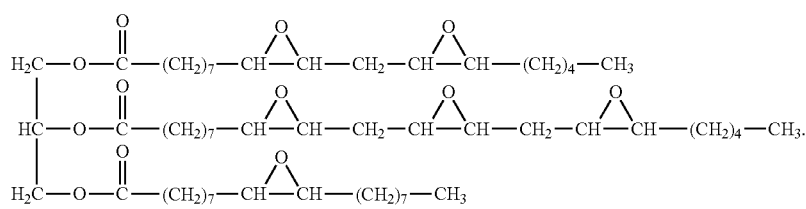

Formula II

An example of an ELO is provided as Formula III:

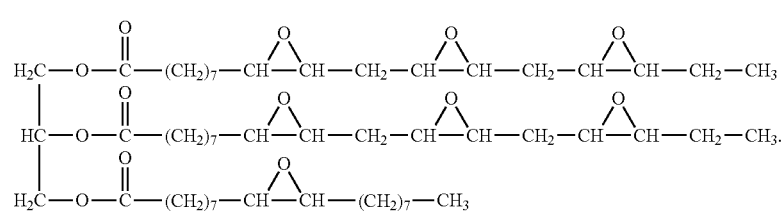

Formula III

Epoxidized vegetable-based oils and fatty acids are then esterified to form epoxidized vegetable oil-based fatty acid esters. The term "alkoxy" as used refers to a functionality having an oxygen atom connected to an alkyl group, including a cycloalkyl group. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning in this disclosure. A methoxyethoxy group is also an alkoxy group within the meaning in this disclosure as is a methylenedioxy group in a context where two adjacent atoms of a structure are substituted. In some embodiments, the epoxidized vegetable oil-based fatty acid are esterified with a methoxy functionality. In some embodiments, the epoxidized vegetable oil-based fatty acid are esterified with a butoxy functionality. In some embodiments, the epoxidized vegetable oil-based fatty acid are esterified with an ethyl hexyloxy functionality.

An example of useful epoxidized vegetable oil-based fatty acid esters include methyl esters of epoxidized linseed oil-based fatty acids. Formulas IV-VI show three methyl esters of epoxidized fatty acid esters derived from linseed oil:

The esterified derivative of an epoxidized organic material for use in embodiment loss circulation material systems have an oxygen oxirane content (OOC) in a range of from about 5.0% to about 10.0%, such as from about 5.5% to about 8.7%, such as about 5.6%, such as 6.2%, such as 6.8%, and such as 8.6%. OOC is the percent amount of epoxidized double bond in a material, where a greater potential number of crosslinks may occur in the resultant product with a greater OOC value.

Dynamic viscosity is the internal resistance to flow at a given temperature. The esterified derivative of an epoxidized organic material for use in embodiment loss circulation material systems have a dynamic viscosity at 25° C. in a range of from about 10 to about 1000 centipoise (cP) or mPa*s (millipascal-second), such as about 19 cP to about 41 cP, such as about 20 cP, such as about 25 cP, such as about 30 cP, or such as about 40 cP.

Epoxy equivalent weight (EEW) denotes the weight of an epoxidized resin in grams that contain the equivalent of one epoxy functional group. The esterified derivative of an epoxidized organic material for use in embodiment loss circulation material systems have an EEW in a range of from about 100 g/eq (grams per epoxy equivalent) to about 1000 g/eq, such as about 180 g/eq to about 295 g/eq, such as about 186 g/eq, such as about 235 g/eq, such as about 258 g/eq, or such as about 286 g/eq.

In some embodiment, the loss circulation material system may include a plurality of esterified derivatives of epoxidized organic materials. In some such embodiments, the Formulas IV-VI

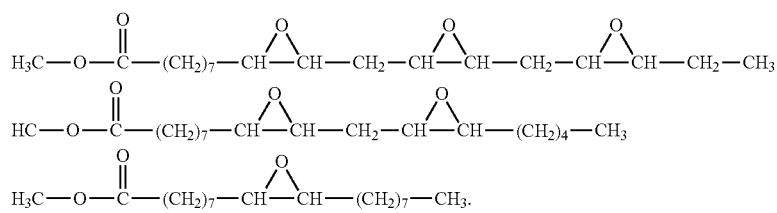

Formula IV is a methyl ester of epoxidized linolenic acid. Formula V is a methyl ester of an epoxidized linoleic acid. Formula VI is a methyl ester of an epoxidized oleic acid. In some embodiments, the epoxidized vegetable oil-based fatty acid ester comprises a mixture of the three methyl esters of epoxidized vegetable oil-based fatty acids of Formulas IV-VI.

Examples of epoxidized vegetable oil-based fatty acid esters derived from naturally occurring materials are commercially available from Arkema Inc. (King of Prussia, Pa.) under the trade name Vikoflex®. Examples include Vikoflex® 4050 (formerly 7080) epoxidized vegetable oil with ethyl hexyl epoxy soyate, Vikoflex® 5075 and 4964 epoxidized PGDO, Vikoflex® 7010 methyl epoxy soyate, Vikoflex® 7040 butyl epoxy soyate, Vikoflex® 9010 methyl epoxy linseedate, Vikoflex® 9040 methyl and butyl epoxy linseedate, and Vikoflex® 9080 ethyl hexyl epoxy linseedate. Other epoxidized vegetable oil-based fatty acid esters that are derived from natural sources are envisioned.

In some embodiments, the esterified derivatives of epoxidized organic material may be blended with an epoxidized organic material. For example, an epoxidized vegetable oil fatty acid esters may be blended with epoxidized vegetable oils. Other examples of epoxidized organic materials include epoxidized soybean oil and epoxidized linseed oil.

plurality of esterified derivatives of epoxidized organic materials include one or more epoxidized vegetable oil-based fatty acid esters.

As previously provided, the loss circulation material system includes a curing agent. The curing agent is operable to cure the esterified derivatives of epoxidized organic materials, such as an epoxidized vegetable oil-based fatty acid ester, present in the loss circulation material system at downhole conditions to form the loss circulation material. In some embodiments, the curing agent includes an amine functionality. In some embodiments, the curing agent includes an anhydride functionality. In some embodiments, the curing agent is a functionalized nanoparticle. In some embodiments, the curing agent may have polyhydric alcohol functionality.

In embodiments, the curing agent may include at least one amine functionality. The term "amine" as used refers to primary, secondary, and tertiary amines having, for example, the formula $N(group)_3$, where each group can independently be H or non-H, such as alkyl and aryl. Amines include but are not limited to: $R-NH_2$, for example, alkylamines, arylamines, alkylarylamines; $R_2NH$ where each R is independently selected, such as dialkylamines, diarylamines, aralkylamines, and heterocyclylamines; and $R_3N$ where each R is independently selected, such as trialkylamines, dialkylarylamines, alkyldiarylamines, and triarylamines. The term "amine" also includes ammonium ions as used.

Curing agents with amine functional groups may include, but are not limited to, at least one of an amine, a polyamine, an amine adduct, a polyamine adduct, an alkanolamine, a phenalkamine, and combinations thereof. Curing agents with at least one amine include amines or polyamines that may include, but are not limited to, aliphatic amines; cycloaliphatic amines; modified cycloaliphatic amines, such as cycloaliphatic amines modified by polyacrylic acid; aliphatic polyamines; cycloaliphatic polyamines; modified polyamines, such as polyamines modified by polyacrylic acid; or amine adducts, such as cycloaliphatic amine adducts or polyamine adducts. Curing agents with at least one amine include amines or polyamines that may include, but are not limited to, polyalkyleneimine, polyetheramine, polyalkylenepolyamine, polyfunctional aliphatic amine, arylalkylamine, and heteroarylalkylamine.

A curing agent that may contain an amine functionality may include, but are not limited to, at least one of ethylenediamine (EDA); trimethyl hexamethylene diamines (TMD); diethylenetriamine (DETA); triethylenetetramine (TETA); meta-xylenediamine (MXDA); aminoethylpiperazine (AEP); tetraethylenepentamine (TEPA); polyetheramine; isophorone diamine (IPDA); diethyltoluenediamine (DETDA); polyoxypropylene diamine; polyethyleneimine (PEI); 1,2-propylenediamine; 1,3-propylenediamine; dipropylenetriamine; tripropylenetetramine; tetrapropylenepentamine; ethylene propylene triamine; ethylene dipropylene tetramine; diethylene propylene pentaamine; ethylene tripropylene pentaamine; diethylene dipropylene pentaamine; triethylene propylene pentaamine; poly(ethyleneoxy)amine; poly(propyleneoxy)amine; butylenediamine; hexamethylenediamine; dipropylenetriamine; mono-, di- and triethanolamines; monomethyl- and monoethyl-monoethanolamines; monomethyldiethanolamine; mono-, di- and triisopropanolamines; dimethylaminopropylamine; cyanamide; aminoguanidine; guanidine; chitosan; hexamethylenetetramine; 1-methyl-2,6-cyclohexyl diamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; 1,3-diaminopropane; diethylamino propylamine; imido-bis-(propylamine); monoethanolamine; monoisopropanolamine, diisopropanolamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-ci-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; propylene oxide-based triamine; 3,3'-dimethyl-4,4'-ciaminocyclohexylmethane, and mixtures thereof.

In some embodiments of the loss circulation material system, the curing agent comprises DETA. An example of DETA is RAZEENCURE® 931, which is available from Jana Chemicals (Jubail Industrial City, Kingdom of Saudi Arabia).

In embodiments, the curing agent may have polyhydric alcohol functionality. Polyhydric alcohols have a plurality of hydroxyl functionalities on the curing agent. Examples include diols, triols, and polyols.

Polyols may include, but are not limited to, polyether polyols, polyester polyols, polybutadiene polyols, polysulfide polyols, natural oil polyols, fluorinated polyols, aliphatic polyols, polyethercarbonate polyols, polycarbonate polyols, hydroxyl-terminated polyolefins, polyether-copolyesters, polycarbonate-copolyesters, polystyrene polyols, butanediol adipate polyols, ethylene glycol adipate polyols, hexane diol adipate polyols, polycaprolactone polyols, polytetramethylene ether glycol (PTMEG) polyols, ethylene oxide (EO) or propylene oxide (PO) polyether polyols, and combinations thereof.

Diols may include, but are not limited to, ethylene glycols; 1,3-propanediol; propylene glycols; polyethylene glycols; polypropylene glycols; diethylene glycols; triethylene glycols; dipropylene glycols; and tripropylene glycols; combinations thereof and their derivatives thereof; and the reaction products formed by reacting ethylene oxide (EO), propylene oxide (PO), polyethylene glycols (PEG), or polypropylene glycols (PPG), and combinations thereof, with active hydrogen base compounds (for example, polyalcohols, polycarboxylic acids, polyamines, or polyphenols). Useful glycols include, but are not limited to, neopentyl glycol; pentanediols; butanediols, such as 1,4-butanediol; and unsaturated diols, such as butyne diols and butene diols.

In addition to diols, useful polyhydric alcohols may include triols, glycerol, and such derivatives as ethylene oxide (EO) or propylene oxide (PO) adducts may be used. Other "higher order" polyols may include pentaerythritol. Another class of polyhydroxy alcohols is the sugar alcohols. The sugar alcohols are obtained by reduction of carbohydrates and differ greatly from the previously mentioned polyols. Combinations and derivatives of these are suitable as well. Specific examples of polyhydric alcohols include 1,2,4-butanetriol, glycerin, and erythritol.

In some embodiments, the curing agent includes an anhydride functionality. A useful anhydride curing agent may include, but is not limited to, maleic anhydride, acetic anhydride, benzoic anhydride, succinic anhydride, a substituted or unsubstituted ($C_1$-$C_{20}$) alkenoic substituted or unsubstituted ($C_1$-$C_{20}$) alkenoic anhydride, a substituted or unsubstituted ($C_1$-$C_{20}$) alkenoic substituted or unsubstituted ($C_1$-$C_{20}$) alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and combinations thereof.

In some embodiments, the curing agent includes a functionalized nanoparticle. The nanoparticles can include, but are not limited to, spherical or ellipsoidal nanoparticles, nanorods, nanotubes, nanowhiskers, nanoribbons, nanosheets, nanoplatelets, and combinations thereof. The nanoparticle forms are particles that have at least one dimension that is less than 100 nanometers, such as less than or equal to about 70 nanometers, or less than or equal to about 50 nanometers. In one embodiment, the nanorods, nanotubes, nanowhiskers, nanoribbons, and nanosheets can have branches if desired. In another embodiment, the nanotubes, nanowhiskers, nanoribbons, and nanosheets can be connected to one another by covalent bonds or by ionic bonds (that is, a branch can connect a first nanotube with a second nanotube or with another first nanorod, first nanoribbon, or similar nanoparticles). The nanoparticles are generally in the form of agglomerates prior to being surface modified.

In one embodiment, the nanoparticles can be carbonaceous. Examples of carbonaceous nanoparticles include but are not limited to fullerenes, carbon nanotubes, metal coated carbon nanotubes, graphite nanoparticles, graphene nanoparticles, and combinations thereof, comprising at least one of the foregoing nanoparticles. In another embodiment, the nanoparticles can be carbonaceous nanoparticles mixed with nano-clays, metal oxide nanoparticles, ceramic nanoparticles, and combinations thereof.

Graphitic or partially graphitic carbon nanotubes can be in the form of fullerenes (buckeyeballs), single wall carbon nanotubes, double wall carbon nanotubes, or multiwall carbon nanotubes. The fullerenes, single wall carbon nanotubes, double wall carbon nanotubes, or multiwall carbon nanotubes can have a tree-ring, fishbone, or graphene platelet type structure.

In one embodiment, the fullerenes and carbon nanotubes and graphene can be coated with metals. Suitable metals include, but are not limited to, transition metals, alkali metals, alkaline earth metals, and combinations thereof. Examples of suitable metals include, but are not limited to, iron, cobalt, nickel, aluminum, copper, titanium, chromium, vanadium, molybdenum, lead, platinum, rhodium, gold, silver, zinc, cadmium, and combinations thereof.

Examples of metal oxide nanoparticles include, but are not limited to, zinc oxide (ZnO) nanoribbons, tin dioxide ($SnO_2$) nanoribbons, indium (III) oxide ($In_2O_3$) nanowires, cadmium oxide (CdO) nanoribbons, gallium (III) oxide ($Ga_2O_3$) nanoribbons, tungsten oxide ($WO_3$) nanowires, titanium dioxide ($TiO_2$) nanotubes, silicon dioxide spherical or ellipsoidal nanoparticles, aluminum oxide spherical or ellipsoidal nanoparticles, zirconium oxide spherical or ellipsoidal nanoparticles, titanium dioxide spherical or ellipsoidal nanoparticles, and combinations thereof.

Nanoparticles may include polyhedral oligomeric silsesquioxanes (POSS), nano-clay, boron nitride and silica derivatives. POSS has the generic formula $(RSiO_{1.5})_n$, where R is an organic moiety and n is 6, 8, 10, 12, or greater. These molecules have rigid, thermally stable silicon-oxygen frameworks with an oxygen to silicon ratio of 1.5. In many instances they have covalently-bound organic groups that provide an organic outer layer comprising, for example, hydrocarbons (for example, phenyl, isooctyl, cyclohexyl, cyclopentyl, or isobutyl).

In embodiments of the composition, the nanoparticles are derivatized with functional groups to react with, crosslink, and cure the esterified derivative of an epoxidized organic material to form the loss circulation material. The fullerenes and the nanotubes may be functionalized on either a sidewall, a hemispherical endcap or on both the side wall as well as the hemispherical endcap, while the other nanoparticles (for example, nanowhiskers, nanoribbons, nanosheets, and nanorods, and graphene sheets) may be functionalized on their ends or on their sidewalls.

At least one functional group is present on the nanoparticle that is configured to react with the esterified derivative of an epoxidized organic material at the conditions downhole. Useful functional groups include, but are not limited to, esters, epoxies, acrylates, methacrylate, amines, alcohols, and anhydrides. Examples of functionalized nanoparticles may include, but are not limited to, amine functionalized carbon nanotubes and amine functionalized graphene.

The functional groups previously described for the carbonaceous nanoparticles may also be covalently bonded to metal oxide nanoparticles and to metal coated carbonaceous nanoparticles. For example, a useful functionalized nanoparticle may include amine functionalized nanosilica.

In some embodiment, the loss circulation material system may include a plurality of curing agents.

In embodiments, the cured loss circulation material is formed as the resultant reaction product of the esterified derivative of an epoxidized organic material and the curing agent. Depending on how introduced, the resultant loss circulation material begins to form as the components of the loss circulation material system are intimately intermixed. The reaction to form the loss circulation material may be initiated wherever the components of the loss circulation material system are first introduced to one another at suitable reaction conditions, for example, before introduction into the wellbore, in a fluid conduit such as a wellbore annulus or drill pipe, at the face of the loss circulation zone, or within the target formation (the low-pressure formation, the loss circulation zone, the water-bearing formation). Regardless of where the reaction is initiated, the cured loss circulation material fully cures in the target formation to mitigate the intrusion from or loss into the target formation.

The loss circulation material system may include an amount of the esterified derivative of an epoxidized organic material sufficient to form a cured loss circulation material. The weight percentages for the esterified derivative of an epoxidized organic material and the curing agent are provided at the time of initially preparing the loss circulation material system, that is, prior to any cross-linking or curing, which may change the chemical make-up of one or more of these constituents. In some embodiments, the amount of the esterified derivative of the epoxidized organic material is in a range of from about 50 wt % (weight percent) to about 99 wt % of the loss circulation material system.

In some embodiments of the loss circulation material, the esterified derivative of the epoxidized organic material comprises a majority (greater than 50 wt %) of the loss circulation material.

The loss circulation material system may include an amount of the curing agent sufficient to form a cured loss circulation material. The curing agent is the limiting material given the biocompatibility of the esterified derivative of an epoxidized organic material. The weight percentages for the esterified derivative of an epoxidized organic material and the curing agent are provided at the time of initially preparing the loss circulation material system, that is, prior to any cross-linking or curing, which may change the chemical make-up of one or more of these constituents. In some embodiments, the amount of the curing agent is in a range of from about 1 wt % to about 50 wt % of the loss circulation material system.

In embodiment methods, the well bore conditions are maintained such that the loss circulation material system cures into the loss circulation material. After introducing the loss circulation material system into the wellbore, maintaining wellbore conditions such that the loss circulation material system converts into a cured loss circulation material may or may not entail routine or non-routine actions, such as the operation of fluid pumps, the running or retrieval of piping, or the circulation of drilling or wellbore fluids in the wellbore. For example, if the loss circulation zone or formation is low pressure, the wellbore may have to be maintained at a pressure less than the formation or loss zone or risk creating flow conditions that may negatively impact the positioning and adhesion of the loss circulation material system while it is curing. As another example, if the formation is a high-pressure water formation, additional weighting of the wellbore fluid or even zonal isolation of that portion of the wellbore may occur before the introduction of the loss circulation material system to plug the formation face. No additional chemical or physical interaction with the curing loss circulation material system should be required. In some embodiments, the wellbore conditions are maintained for a period in a range of from about 0.5 hour to about 24 hours, during which time the loss circulation material forms.

The various esterified derivative of an epoxidized organic material in the loss circulation material system may be in liquid form initially. Upon combining the esterified derivative of an epoxidized organic material with the curing agent to form the loss circulation material system, the esterified derivative of an epoxidized organic material reacts with the curing agents to convert into a resultant semi-solid or solid loss circulation material. Transition of the loss circulation material system from a liquid to a solid involves formation of covalent bonds via cross-linking reactions. During the first moments of reaction, the formation of covalent bonds in the presence of reactants results in an increase in viscosity in the loss circulation material system, leading to a transition from a liquid material to a gel material. As the curing process continues, the loss circulation material system may begin to form into a solid, non-porous, three-dimensional thermoset polymer network. During the transition from fluid to solid through cross-linking, the increase of viscosity in the loss circulation material system may enable the loss circulation material system to partially and then continuously resist fluid flow driven by differential pressure. Fluid flow for low-pressure zones, loss circulation zones, and some water-bearing formations versus the wellbore tends to be from the wellbore into the formation. At the point in the curing process, a pressure differential may form across the curing loss circulation material system as the cured material begins to materially block fluid flow. With the mitigation of fluid flow into or out of the loss circulation zone or water-bearing formation, the remediation is technically complete. The loss circulation zone or water-bearing formation no longer has a pathway to receive fluids from or convey fluids to the surface through the wellbore.

As the components of the loss circulation material system continues to react, an impermeable barrier forms at the face of or inside the formation comprising the loss circulation zone or the water-bearing formation. As a cured product, fluids (liquids, gases) may not be conducted through the point of application of the loss circulation material system. A significant differential pressure may exist between the two sides of the cured resultant.

The loss circulation material system may have a cure time that enables the loss circulation material system to be introduced to the loss circulation zone or the water-bearing formation before the loss circulation material system becomes unpumpable due to increased viscosity from cross-linking. In some embodiments, the cure time may be in a range of from about 0.5 hours to about 24 hours. In some embodiments, the loss circulation material system is configured to cure into a loss control material in a period ranging from about 0.5 hour to about 24 hours at wellbore conditions.

The embodiment loss circulation material is both immobile and impenetrable in the formation or zone being treated, even under differential pressure conditions. The embodiment loss circulation material system may be used for closing off the fluid flow pathway into a loss circulation zone, sealing the face of a water-bearing formation, or shutting a portion of a hydrocarbon-beating formation where water fingering or other high-water content production fluid results in water entering the wellbore. In embodiments of the loss circulation material system, the composition may be adapted to different downhole conditions by changing the total or relative concentrations of the esterified derivative of an epoxidized organic material or the curing agents to modify the specific gravity, viscosity, mechanical properties, curing time, or other properties, of the loss circulation material system. The cured loss circulation material may be capable of withstanding a wide range of temperatures and pressures without failing or deteriorating. Failing or deterioration of the LCM would allow liquids or gases to penetrate into or through the LCM into or out of the loss circulation zone or the water-bearing formation and into the wellbore. As a non-limiting example, the loss circulation material, once cured, may be operable to withstand temperatures of from about 20 degrees Celsius (° C.) to about 205° C. The cured LCM may also be able to withstand temperature cycling within a temperature range of from about 20° C. to about 205° C. The cured loss circulation material may be configured to withstand differential pressure conditions of up to about 20,000 psid (137.9 megapascals (MPa)) (1 psi equals 0.00689476 MPa). For example, in some embodiments, the cured loss circulation material may be configured to withstand a pressure differential of from about 14 psid (96 kPa or 0.096 MPa differential) to about 20,000 psid (137.9 MPa differential) without failing or deteriorating.

Method of Use

An embodiment of a method of using the loss circulation material system includes introducing the composition to a wellbore. Introducing embodiment loss circulation material systems into a wellbore may include introducing the material to a loss circulation zone associated with a formation in fluid communication with the wellbore.

Referring back to FIG. 1, the loss circulation material system may be blended into the drilling mud 182 in the mud storage tank 186 and pumped downhole to mitigate the effects of the target formation 102. The drilling mud 182 containing the now reacting loss circulation material system flows downhole through the drill string 134, out the drill bit 138, and back uphole through the annulus formed by the drill pipe 136 and the wellbore wall 124. Upon reaching the target formation 102, at least a portion of the curing loss circulation material system is introduced into the target formation 102, where the reaction to form the loss circulation material is completed.

In an alternative method of introduction of the loss circulation material system, the esterified derivative of an epoxidized organic material may be blended and circulated with the drilling mud 182 that is circulating through the wellbore 120. After the esterified derivative of an epoxidized organic material has achieved distribution throughout the drilling mud 182, the curing agent may be introduced into the bottom of the wellbore 120 through the drill string 134 via the drill bit 138. The now reacting loss circulation material system is introduced into the target formation 102, where the reaction to form the loss circulation material is completed.

Figure 2:
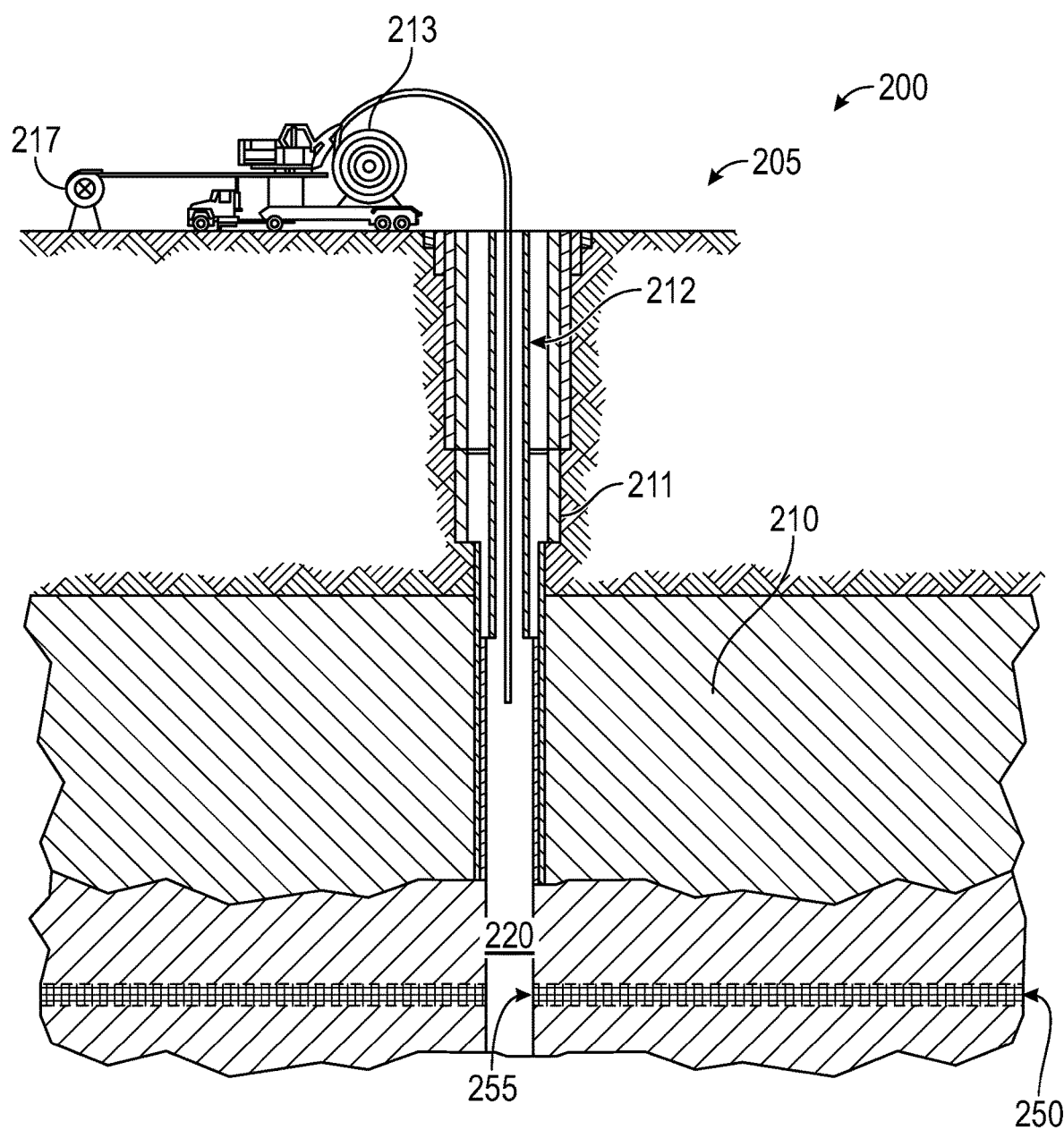
FIG. 2 is a diagram that illustrates a well environment 200.

FIG. 2 is a diagram that illustrates a well environment 200 in accordance with one or more embodiments. Well environment 200 includes a subsurface 210. Subsurface 210 is depicted having a wellbore wall 211 both extending downhole from a surface 205 into the subsurface 210 and defining a wellbore 220. The subsurface also includes target formation 250, which may represent a low-pressure formation, a water-bearing formation or a loss circulation zone, to be treated. Target formation 250 has target formation face 255 that fluidly couples target formation 250 with wellbore 220 through wellbore wall 211. In this instance, both casing 212 and coiled tubing 213 extend downhole through the wellbore 220 into the subsurface 210 and towards target formation 250.

With the configuration in FIG. 2, the components of the loss circulation material system may be separately introduced to maximize reaction time in situ. The esterified derivative of an epoxidized organic material and the curing agent are introduced both simultaneously and separately into the wellbore to treat the target formation. In an embodiment of the method, the esterified derivative of an epoxidized organic material is introduced into the subsurface 210 and towards formation 250 via a pump 217 through the coiled tubing 213. The curing agent is introduced through the casing 212. In an alternative embodiment, the esterified derivative of an epoxidized organic material is introduced via a casing 212 and the curing agent is introduced via a coiled tubing 213, and both solutions are introduced simultaneously. The reaction forming the loss circulation material starts upon intimate mixing of the two components downhole. In both embodiments, the creation of the loss circulation material may occur in the wellbore 220, at the face 255 of the target formation 250, within target formation 250, in some, or in all of these locations based upon the concentration of the reactants at the particular location and the rate of reaction between the esterified derivative of an epoxidized organic material and the curing agent in situ.

Embodiment methods of treating a formation may include maintaining the wellbore such that the loss circulation material system fully cures. Action may be taken to prevent detrimental impacts within the wellbore to the curing of the loss circulation material system. For example, the circulation rate of the wellbore fluid may be significantly reduced to prevent non-reacted loss circulation material system reactants from drifting away from the treatment site. In reducing the wellbore fluid circulation, the heat from the formation should become more prevalent and relatively accelerate the curing rate of the loss circulation material than if normal wellbore circulation occurred. Other action may be required, for example, spotting of a heavy wellbore fluid at the face of the wellbore to maintain adequate fluid pressure on the formation at the bottom while reducing equivalent circulating density (ECD) uphole. Other fluids may need to be circulated or spotted uphole or downhole of the treatment area to maintain wellbore stability or to perform routine and necessary operations during the curing period. As appreciated by those of ordinary skill in the art, the act of maintaining conditions in a wellbore does not mean that there is a lack of wellbore management and control actions being taken; rather, many actions on the surface are required to keep the conditions in the wellbore sufficient for facilitating the conditions for gelling and curing of the loss circulation material system into the resultant LCM.

EXAMPLES

The following examples illustrate one or more features of the present disclosure. It should be understood that these examples are not intended to limit the scope of the disclosure or the appended claims in any manner.

Example 1

In a first example, 10 grams (g) of Vikoflex® 9010 methyl epoxy linseedate was introduced into a sample tube. Then, 2 g of RAZEENCURE® 931 DETA curing agent was added to the methyl epoxy linseedate and mixed by stirring. After addition of the curing agent to the esterified derivative of an epoxidized organic material, the loss circulation material system was allowed to cure at 250° F. for 16 hours. The gelling time of the resin was determined to be 3 hours. Gelling time of the resin is the time at which the resin is unable to flow after addition of the curing agent. After 16 hours of curing the loss circulation material system at an elevated temperature, the resultant loss circulation material was removed and observed to be fixed in position in the bottom of the sample tube. The embodiment loss circulation material remained undistorted even when inverted, indicating full curing. The cured loss circulation material has a medium amber hue and is translucent.

Example 2

In a second example, 10 g of Vikoflex® 7010 methyl epoxy soyate was introduced into a sample tube. Then, 2 g of RAZEENCURE® 931 DETA curing agent was added to the methyl epoxy soyate and stirred. After addition of the curing agent to the esterified derivative of an epoxidized organic material, the loss circulation material system was allowed to cure at 250° F. for 16 hours. The gelling time of the resin was determined to be 5 hours. After 16 hours of curing the second loss circulation material system at an elevated temperature, the resultant loss circulation material was removed and observed to be fixed in position in the bottom of the sample tube. The embodiment loss circulation material remained undistorted even when inverted, indicating full curing. The cured loss circulation material has a slightly darker hue than Example 1 but was also translucent.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps "Optionally" means that the subsequently described event or circumstances may or may not occur. The description includes instances where the event or circumstance occurs and instances where it does not occur.

When either words "approximately" or "about" are used, this term may mean that there can be a variance in value of up to ±10%, of up to 5%, of up to 2%, of up to 1%, of up to 0.5%, of up to 0.1%, or up to 0.01%.

The term "substantially" as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of particular implementations, those skilled in the art, having benefit of this disclosure, will appreciate that other embodiments may be devised which do not depart from the scope of the present disclosure and may be within the purview of the following claims.

What is claimed is:

1. A method of treating a formation, comprising:
   introducing a loss circulation material system through a wellbore into a formation; and
   maintaining wellbore conditions such that the loss circulation material system cures into a loss circulation material in the formation;
   where the loss circulation material system comprises an esterified derivative of an epoxidized organic material and a curing agent; and
   where the esterified derivative of an epoxidized organic material has a formula of:

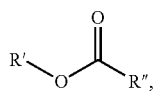

where R' comprises H, a substituted or an unsubstituted (C1-C12) hydrocarbyl group;
where R" comprises a substituted or an unsubstituted (C2-C30) hydrocarbyl group, including where at least one oxygen atom is attached to two different adjacent carbon atoms of the (C2-C30) hydrocarbyl group; and
where the esterified derivative of an epoxidized organic material is an epoxidized vegetable oil-based fatty acid ester and the curing agent is an amine-based curing agent, and
where the esterified derivative of an epoxidized organic material is in range of from about 50 wt % (weight percent) to about 99 wt % of the loss circulation material system.

2. The method of claim 1 where the formation to be treated includes a loss circulation zone.

3. The method of claim 1 where the formation to be treated is a water-bearing formation.

4. The method of claim 1 where the formation to be treated is a hydrocarbon-bearing formation.

5. The method of claim 1 where the esterified derivative of the epoxidized organic material and the curing agent are introduced simultaneously and separately.

6. The method of claim 1 where the wellbore conditions are maintained for a period in a range of from about 0.5 hour to about 24 hours.

7. The method of claim 1 where the loss circulation material formed is configured to withstand a differential pressure of up to 20,000 pounds-per-square-inch differential (psid).

8. A loss circulation material system comprising a mixture of an esterified derivative of an epoxidized organic material and a curing agent, where the esterified derivative of an epoxidized organic material has a formula of:

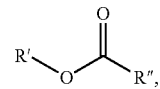

where R' comprises H, a substituted or an unsubstituted (C1-C12) hydrocarbyl group;
where R" comprises a substituted or an unsubstituted (C2-C30) hydrocarbyl group, including where at least one oxygen atom is attached to two different adjacent carbon atoms of the (C2-C30) hydrocarbyl group; and
where the esterified derivative of an epoxidized organic material is an epoxidized vegetable oil-based fatty acid ester and the curing agent is an amine-based curing agent, and
where the esterified derivative of an epoxidized organic material is in range of from about 50 wt % (weight percent) to about 99 wt % of the loss circulation material system.

9. The loss circulation material system of claim 8 where the esterified derivative of an epoxidized organic material is an epoxidized vegetable oil-based fatty acid ester selected from the group consisting of epoxidized vegetable oil with ethyl hexyl epoxy soyate, epoxidized propylene glycol dioleate (PGDO), methyl epoxy soyate, butyl epoxy soyate, methyl epoxy linseedate, methyl and butyl epoxy linseedate, ethyl hexyl epoxy linseedate, and combinations thereof.

10. The loss circulation material system of claim 8 further comprising an epoxidized organic material.

11. The loss circulation material system of claim 8 configured to cure into the loss control material in a period ranging from about 0.5 hour to about 24 hours when maintained at wellbore conditions.

12. A loss circulation material comprising the cross-linked reaction product of an esterified derivative of an epoxidized organic material and a curing agent, where the esterified derivative of an epoxidized organic material is an epoxidized vegetable oil-based fatty acid ester and the curing agent is an amine-based curing agent, and where the esterified derivative of an epoxidized organic material is in range of from about 50 wt % (weight percent) to about 99 wt % of the loss circulation material.

13. The loss circulation material of claim 12 where a majority of the material of the loss circulation material is comprised of the esterified derivative of the epoxidized organic material.

14. The loss circulation material of claim 12 where the loss circulation material is configured to withstand a differential pressure of up to 20,000 pounds-per-square-inch differential (psid).

* * * * *